(12) United States Patent
Schulz et al.

(10) Patent No.: US 7,161,471 B2
(45) Date of Patent: Jan. 9, 2007

(54) SYSTEM FOR AN AUTOMOTIVE VEHICLE (75) Inventors: Martin Schulz, Bedburg (DE); Peter Hornschuh, Overath (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 582 days.

(21) Appl. No.: 10/442,350

(22) Filed: May 21, 2003

(65) Prior Publication Data
US 2003/0218381 A1 Nov. 27, 2003

(30) Foreign Application Priority Data
May 23, 2002 (DE) ............................. 102 22 798

(51) Int. Cl.
*B60R 25/00* (2006.01)
(52) U.S. Cl. ............................. 340/426.36; 340/310.11; 340/426.11; 340/426.28; 340/825.69; 307/10.1
(58) Field of Classification Search ............ 340/426.36, 340/426.13, 426.28, 426.27, 425.5, 310.01, 340/310.06, 825.72, 426.17, 426.1, 426.16, 340/825.69, 310.11, 5.64, 5.72; 307/10.1; 701/49; 455/99
See application file for complete search history.

(56) References Cited
U.S. PATENT DOCUMENTS

| | | | |
|---|---|---|---|
| 5,274,636 A | 12/1993 | Halter et al. ............... 370/85.1 |
| 5,363,405 A | 11/1994 | Hormel ......................... 375/7 |
| 5,783,994 A | 7/1998 | Koopman | |
| 6,208,305 B1 * | 3/2001 | King ........................... 343/713 |
| 6,229,434 B1 * | 5/2001 | Knapp et al. .......... 340/310.01 |
| 6,275,167 B1 | 8/2001 | Dombrowski et al. . 340/825.57 |
| 6,472,771 B1 * | 10/2002 | Frese et al. ................ 307/10.1 |

FOREIGN PATENT DOCUMENTS

| | | |
|---|---|---|
| DE | 195 24 430 | 1/1997 |
| EP | 1 122 969 A1 | 6/2000 |
| GB | 675096 | 7/1952 |
| GB | 2 306 031 A | 4/1997 |
| GB | 2 327 814 A | 2/1999 |

OTHER PUBLICATIONS
RF Tutorial XP-001058707, Grant Bingeman, Transmission lines as antennas, Jan. 2001.

* cited by examiner

*Primary Examiner*—Davetta W. Goins
(74) *Attorney, Agent, or Firm*—Brinks Hofer Gilson & Lione (57) ABSTRACT A system for a vehicle for receiving and transmitting wireless transmitted radio data that is emitted from outside a vehicle, the system having an antenna for receiving the radio data, a first module disposed within the vehicle, a second module and a transmission line for transmitting the radio data substantially within the vehicle, the antenna of the system being connected to a receiver disposed within the second module such that the radio data is transmittable from the second module to the first module through the transmission line, and the antenna being formed by an electrical line that also forms the ground connection of the second module.

21 Claims, 6 Drawing Sheets

SYSTEM FOR AN AUTOMOTIVE VEHICLE

CLAIM OF PRIORITY

This application claims priority to German application number 102 22 798.2, which was filed on May 23, 2002.

TECHNICAL FIELD

This invention relates to a radio frequency receiver system for a vehicle for receiving and transmitting wireless transmitted radio signals that are emitted from outside the vehicle.

BACKGROUND

Wireless door lock systems, or door lock and unlock systems, that can be actuated from outside the vehicle are well known in the art. In a typical system, a control signal is emitted through a radio remote control and received by a receiving antenna disposed on the vehicle. Such a system may be capable of automatically unlocking all the doors and the trunk at the same time. This type of door lock system is particularly convenient and is provided as standard equipment even in relatively low cost vehicles.

SUMMARY

An aspect of the present invention is an inventive system for a vehicle for receiving and transmitting wireless transmitted radio data that are emitted from outside a vehicle. The inventive system has an antenna for receiving the radio data and a first module disposed within the vehicle. A second module and a transmission line connected to the first module is provided for transmitting the radio data substantially within the vehicle. The antenna of the inventive system is connected to a receiver that is disposed within the second module such that the radio data is transmittable from the second module to the first module through the transmission line. The antenna is formed by an electrical line that also forms the ground connection of the second module.

These and other aspects and advantages of the inventive system will become apparent upon reading the following detailed description of the inventive system in combination with the accompanying drawings.

DETAILED DESCRIPTION

The following description of the preferred embodiments of the inventive system is not intended to limit the inventive system to these preferred embodiments, but rather to enable any person skilled in the art of radio frequency receiver systems to make and use the inventive system.

Figure 1:
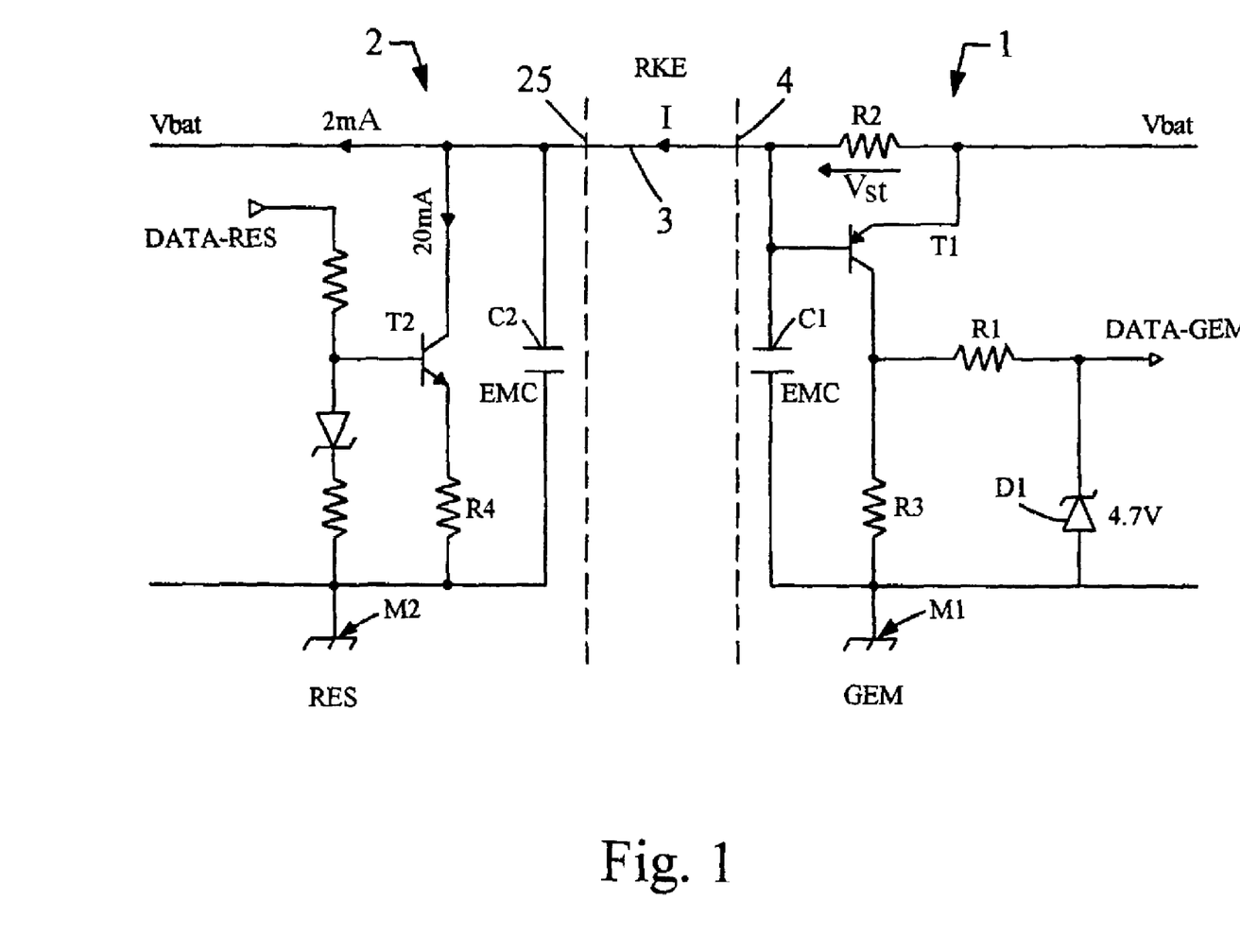
FIG. 1 is a schematic depicting circuitry of the inventive system with two circuit modules for outputting signals received on a transmission line from an antenna receiver.

Referring to FIG. 1, the inventive vehicle access system is shown comprised of a first module (logic module) 1 and a second module (receiving module) 2. The first module 1 is a signal detection circuit that is configured with a first transistor T1 for receiving signals from a transmission line 3. For this purpose, the base input of a first transistor T1 is electrically connected through a dropping resistor (not shown) to the transmission line 3, which is a single wire line. The collector of the first transistor T1 is connected to output signal Data_GEM via a resistor R1. Output signal Data_GEM can be connected either without a bus, or directly or indirectly, by means of a bus such as a CAN bus to an electrically actuated door lock system (not shown).

Further, a resistor R3 is connected between the collector of the first transistor T1 and ground M1. A resistor R2 is connected in the transmission line 3 as a shunt between the emitter and base of the first transistor T1 and generates a control voltage Vst for transistor T1. This voltage is proportional to the current I flowing in the single wire transmission line 3. The emitter of a second transistor T2 in the left portion of FIG. 1 is connected to ground M2 through a resistor R4. The second transistor T2 is capable of increasing the current flowing in the single wire transmission line 3 to I=20 mA.

A 4.7 volt Zener diode D1 is connected between the output signal Data_GEM and ground M1 so that when the transistor T1 is triggered, i.e., when it presents low impendence between emitter and collector, the battery voltage Vbat of 12 volts is reduced to a constant voltage of 4.7 volts. This 4.7 volts corresponds in its order of magnitude to a high level signal. If, by contrast, the transistor T1 is not triggered, i.e., when it presents high impedance between the emitter and collector, the signal obtained at the output signal Data_GEM is a low level signal, that is a voltage level of 0 volts.

A capacitor C1 is disposed between the connecting terminal 4 of the first module 1 and ground M1 in order to block high frequency interference and ESD pulses from the transmission line 3, which serves at the same time to supply voltage to the second module 2. It is thus possible to transmit data signals and to supply voltage to the second module 2 with this simple circuit design.

In the second module 2, which is disposed on the opposing end of the single wire transmission line 3, a second capacitor C2 is connected between a ground connection M2 and a connection terminal 25. The second module 2, comprising the circuit elements shown in the left portion of FIG. 1, is a collector circuit having a second transistor T2 that is triggered via a data control input from an antenna receiver. The antenna receiver receives radio signals and generates a control signal Data_RES.

The single wire transmission line 3 connected between the first module 1 and the second module 2 is a point-to-point communication path, rather than a bus communication configuration with two bus lines. As the single wire, transmission line 3 is the unique transmission line. The first module 1 and second module 2 must have ground connections M1, M2 to allow the current to flow back.

Accordingly, the scheme depicted in FIG. 1 consists of the first semiconductor circuit of module 1 that is realized by a transistor T1 that is suited to detect a higher current value in the single wire transmission line 3, the transistor T1 being connected on its the control side to a resistor R2 that acts as a shunt. The scheme depicted in FIG. 1 also includes the second semiconductor circuit of module 2 that is realized a transistor T2, which when triggered increases the current in the single wire transmission line 3. The normal and increased current are assigned as low logic and high logic levels. The high logic level being 20 mA, which is 10 times higher than the required battery current of 2 mA for the second module 2. This difference between the low and high logic levels may be less, but the increased current must be at least 5 times, i.e., the desired range is between 5 to 10 times higher.

Figure 2:
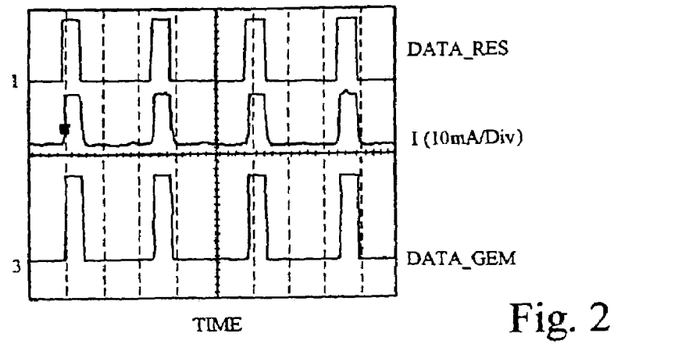
FIG. 2 is a current pulse diagram for the transmission line of the inventive system showing the pulses emitted by the second module and pulses received by a first module.
Figure 3:
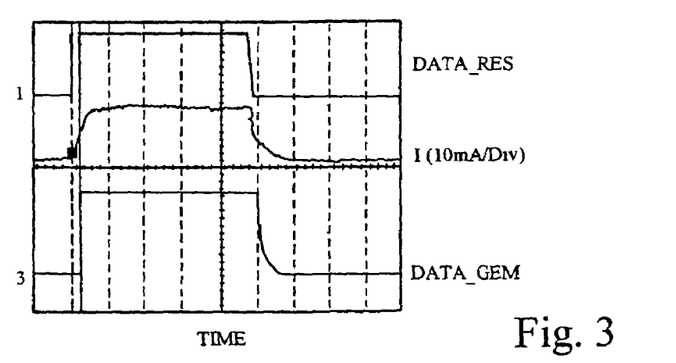
FIG. 3 is a current pulse diagram according to FIG. 2 with a higher time resolution.
Figure 4:
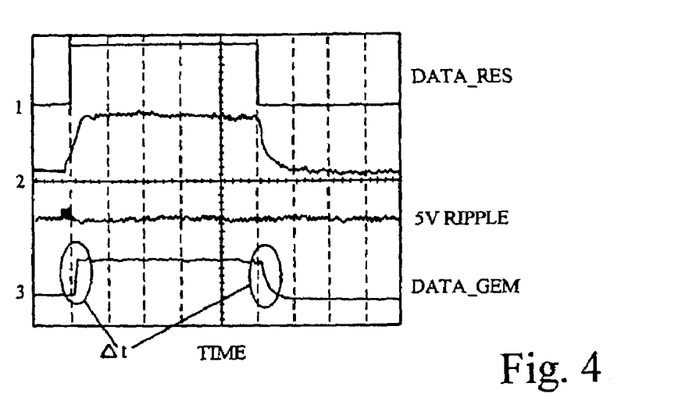
FIG. 4 is a current pulse diagram additionally showing a 5 volt voltage level representing the stability of the current supply of the second module.

The transmission of signals from the circuitry shown in FIG. 1 with its single wire transmission line 3 will be explained in greater detail below with reference to the FIGS. 2 through 4 depicting oscilloscope output.

As shown in FIG. 2, switching pulses applied to the control signal Data_RES input are forwarded via the single wire transmission line 3 (current I) to the Data_GEM output. The voltage level at the Data_GEM output ranges from 0 volt to 4.7 volt (2 V/Div.) and, as shown in FIG. 3, the time delay of the positive edge of the pulse i.e., from low to high, is of 4.8 µs (20 µs/Div.). The time delay Δt between low and high, and between high and low, as shown in FIG. 4, occurs as a result of the 100 nF capacitor in the voltage control circuit. The 5 V ripple signal shown in FIG. 4 illustrates the ripple factor overlaid on a regulated voltage in the second module 2 by a commercial voltage regulator that is contained in the second module (not illustrated in FIG. 1).

The circuit depicted in FIG. 1, in a simple manner and at low cost, supplies current and transmits data via a single wire transmission line 3, the circuit being relatively interference-free on account of the high signal current of 20 mA flowing within the single wire transmission line 3. As a result, the single wire transmission line 3 does not need to be shielded. In principal, however, it could also be implemented as a coaxial cable. In principal, the radio data transmitted in transmission line 3 are serial, digital data stream signals.

Figure 12:
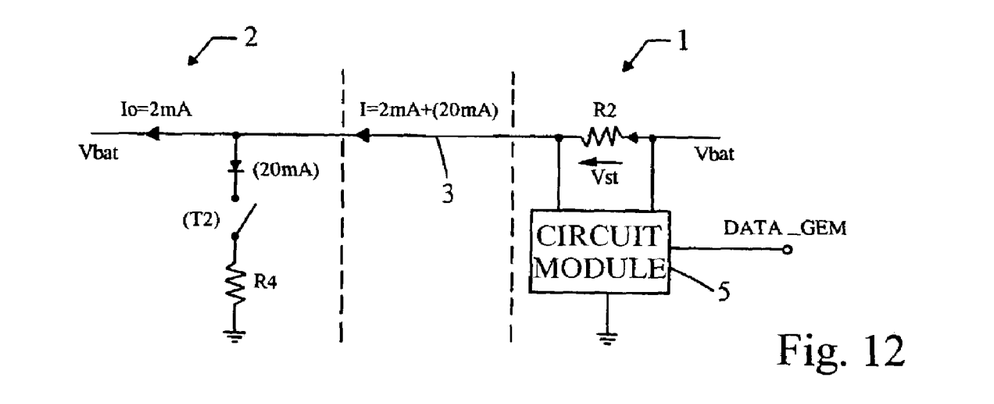
FIG. 12 is a schematic depicting in simplified form the circuitry of FIG. 1.

FIG. 12 illustrates in simplified form the principal of the circuitry according to FIG. 1. As can easily be seen from FIG. 12, the control voltage Vst of the first transistor T1 described herein above is proportional to current 1. The switching threshold of the first transistor T1 must, however, be higher than the supply current, which is 2 mA. The first transistor T1 is not allowed to be switched by the supply current $I_0$ of 2 mA. Although, it is also possible that the transistor T1 would open slightly at the supply current of 2 mA. As a result, the voltage at the Data_GEM output must then be so low that it corresponds to a logic "LOW" state.

Figure 13:
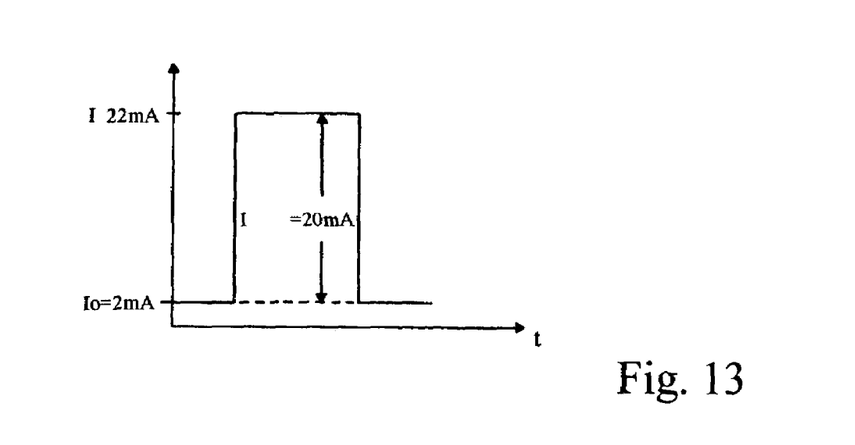
FIG. 13 is a current pulse diagram depicting on an enlarged scale a current pulse within the transmission line of the invention system.

To obtain a low-cost circuit, it is accordingly appropriate to have the first module 1 comprised of a circuit module 5 with a current detecting device and a first transistor T1. The current detecting device, which is formed by the resistor R2 and the transistor T1, detects the total current I flowing within the transmission line 3. The current detecting device, and in particular the transistor T1, are implemented and connected in such a manner that a signal at the Data_RES control input is transmitted to the Data_GEM output of the first module 1. By contrast, the second module 2 has circuitry in which the second transistor T2 is capable of switching a relatively high switching current $I_{schalt}$ relative to the supply current $I_0$. FIG. 13 depicts the current in the single wire transmission line 3, which may fluctuate between 2 mA and up to 22 mA.

A digital encoded or uncoded radio command "lock" or "unlock" may thus be transmitted within the automotive vehicle. To receive the radio data, an antenna receiver is needed. The antenna receiver (not shown) is a so-called "smart receiver". A "smart receiver" is defined by its ability to carry out an operating cycle in which it is able to decode a signal and detect a transmitter without requiring the assistance of a host microprocessor. A microcontroller integrated in the antenna receiver advantageously has a current consumption of 1 mA maximum. This integrated microcontroller moreover has an operating cycle of 1:10 so that its actual operating current is only 100 µA.

With such a "smart receiver" being used in the second module 2, a low standby current consumption of the entire system is achieved with no added burden created on the microprocessor (located in the first module 1), which is not slowed down as a result and is left free to perform other control tasks, such as door monitoring, by way of example. Other known microcontroller solutions are much more complicated (e.g., Motorola HC 12; maximum 45 mA@8 MHz). At an operating cycle of 1:10, the standby current would be 4.5 mA, i.e., 4.4 mA higher than with the smart receiver solution.

The smart receiver has hardware and software that are separated from other functions, resulting in higher efficiency and reliability. As illustrated in the block diagram in FIG. 5, the function of the host computer and the response time of the host computer are independent of a radio signal. Accordingly, various control tasks are assigned to the various functional modules 6 and 7, the functional module 6 comprising the receiver, and the functional module 7 comprising a microcontroller, which draws e.g., 1 mA current. If one common host computer were provided for all of the tasks to be performed it would be slower. Compared to known host module solutions, the costs for the hardware, process design, and quality inspection are reduced.

Figure 5:
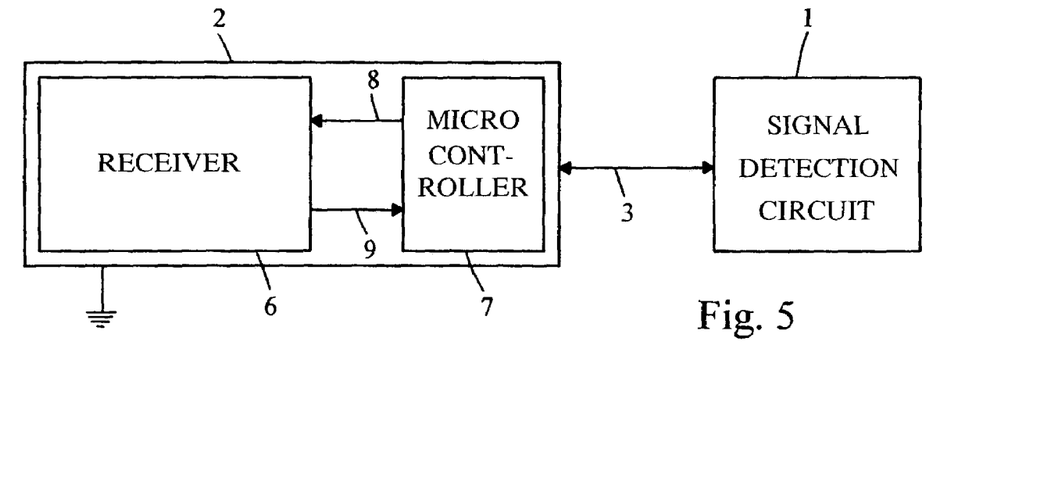
FIG. 5 is a block diagram of the inventive system showing the receiver functional module and microcontroller fuctional module.

FIG. 5 shows an advantageous embodiment of a receiver with a stand alone mode. In the right portion of FIG. 5, a first module 1 is depicted that is provided with a logic printed circuit board. The left portion of FIG. 5 depicts the second module 2 consisting of a first functional module 6 and a second functional module 7.

The first functional module 6 includes the actual antenna receiver with its various filters, more specifically, an intermediate frequency filter and a demodulation circuit. The second functional module 7, containing a microprocessor with a very low current consumption for decoding the radio signals, determines the operating cycle of the antenna receiver through a signal line 8 that carries a wake-up/sleep signal. The signal line 8 is connected to the antenna receiver in the first functional module 6. The two functional modules 6 and 7 are connected to a data line 9 in which data may be transmitted to the second functional module 7. These data correspond to a door unlock or lock command that may be emitted via a remote control.

Figure 6:
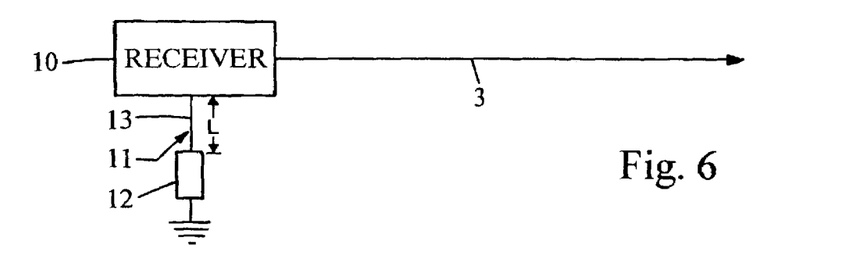
FIG. 6 is a block diagram that depicts the receiver with an antenna provided with a decoupler.
Figure 7:
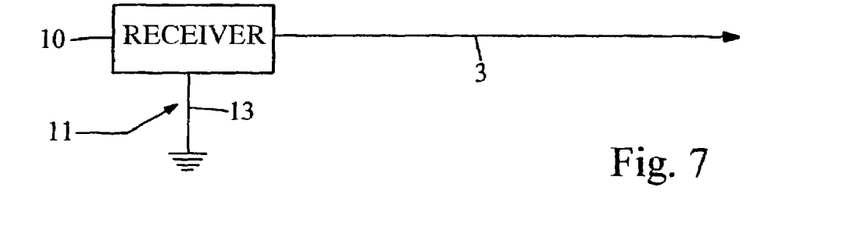
FIG. 7 is a block diagram according to FIG. 6 without the decoupler.

FIGS. 6 and 7 show two variants in accordance with the invention of an antenna receiver 10 with an antenna 11. The antenna 11 depicted in FIG. 6 is additionally provided with a decoupling inductor 12. As shown in FIG. 6, the antenna 11 is integrated into the ground line 13. In the embodiment depicted in FIG. 7, there is no additional coil provided. Again, the ground line 13 acts as the antenna 11.

Figure 11:
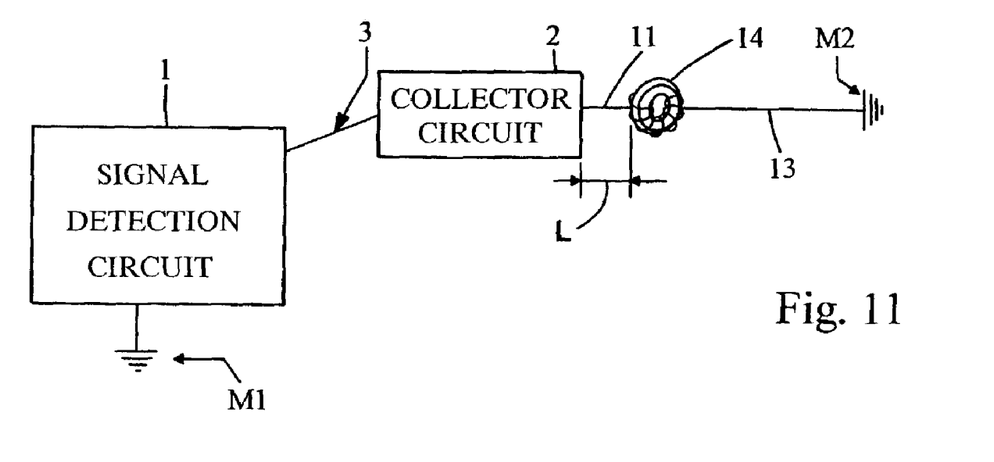
FIG. 11 is a block diagram depicting the antenna of the inventive system.

As shown in FIG. 11, a ferrite toroid 14 can be provided between the ground M2 and the second module 2, one or several line sections of the ground line 13 being wound up in said ferrite toroid 14 so that a coil arrangement with one or several windings is obtained. The second module 2 is suitably mounted within the vehicle either within the rearview mirror, behind an instrument panel or on one of the A, B or C columns, e.g., on the front passenger side.

Figure 8:
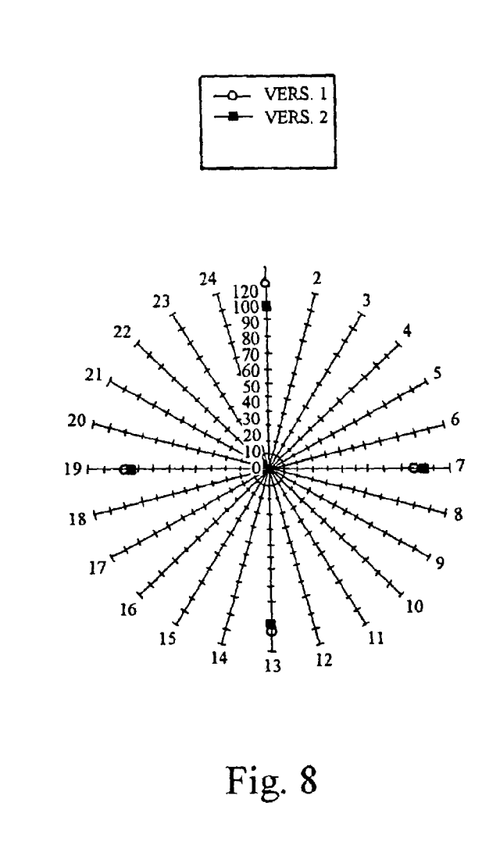
FIG. 8 is a position diagram of the receiver in FIGS. 6 and 7 depicting the case in which the second module is disposed above the inner rearview mirror of the vehicle.

FIG. 8 shows a result of a measurement of the system according to the invention as a function of the site of operation of the remote control when the antenna 11 is positioned together with the second module 2 above the rearview mirror in the passenger compartment, the results of measurement Vers 1 corresponding to an antenna 11 arrangement according to FIG. 6 and the results of measurement Vers 2 corresponding to an antenna 11 arrangement according to FIG. 7. In all of the measurements, the graduation 0 to 120 corresponds to the distance between the remote control and the second module 2 in meters.

As can be observed in FIG. 8, the rearview mirror is particularly convenient with regard to the range of the antenna 11 without it being mounted outside of the vehicle. This antenna 11 arrangement according to FIG. 8 permits the realization of a remote control having a range of approximately up to 100 m.

Figure 9:
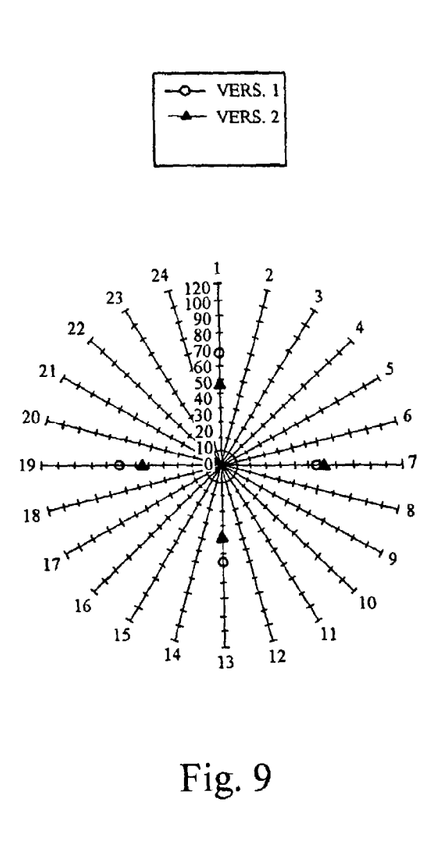
FIG. 9 is a position diagram of the receiver in FIGS. 6 and 7 depicting the case in which the second module is disposed behind the instrument panel.

According to a second variant depicted in FIG. 9, the antenna 11 is positioned together with the second module 2 behind the instrument panel of the automotive vehicle. Distances of up to 50 m may be realized with this variant.

Figure 10:
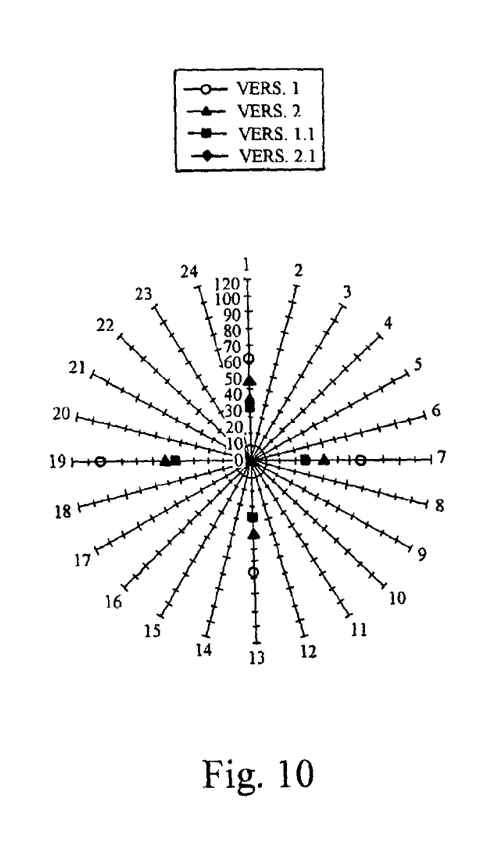
FIG. 10 is a position diagram of the receiver on FIGS. 6 and 7 depicting the case in which the second module is disposed on the front passengers side above a vertical bar with two different ground cable runs.

FIG. 10 shows the results of measurements made with a third variant. In this variant, the antenna 11 is disposed together with the second module 2 on the front passenger side above a vertical support. With this arrangement remote control is also possible.

The measurements Vers 1 and Vers 2 that are assigned to the various embodiments according to FIG. 6 (Vers 1) or to FIG. 7 (Vers 2) are based on an arrangement in which the antenna 11, which acts as a ground connection, is arranged so as to form an arch, or more specifically a "U".

The results of the measurements Vers 1.1. and Vers 2.1 relate to an arrangement in which the antenna 11 or ground connection is disposed in closer proximity to the roof of the vehicle, the ground connection or antenna 11 being oriented in a straight line.

The antenna 11 is the ground connection of a printed circuit board of the second module 2. The ground connection according to the invention is further implemented in proximity to the radio receiver, or antenna receiver 10, which is disposed in the second module 2, the very ground connection 13 acting as an antenna 11 as a result thereof. The antenna 11 is virtually integrated in the ground connection 13. The ground connection 13 is used as an antenna 11.

Accordingly, the mass connection M2 of the second module 2 is implemented by the line 13, the antenna 11 being integrated into the ground line 13 in such a manner that the ground line 13 is the very antenna 11. According to the invention, the ground connection M2 of the second module 2 is implemented by an electric line 13 that forms the very antenna 11.

The ground line 13, or this cable, is a flexible line. It preferably has an insulating sheath, which is not absolutely necessary though. The line 13 may be made from a flexible cord or from a relatively thin and solid wire. The line 13 is not a copper trace that is e.g., disposed on a printed circuit board. It is not a direct connection between a metal housing and the vehicle's bodywork. It may be protected by a foam sleeve of a length L as depicted in FIG. 11 between the second module 2 and an inductor 12. The sleeve holds the antenna line 11 spaced a defined distance from the bodywork of the vehicle.

In a preferred embodiment of the invention there is provided a ring-shaped or toroid ferrite element 14, as shown in FIG. 11. The electrical length L of the antenna 11 is calculated form the distance between the ferrite element 14 or an inductor 12 and the second module 2. The length L corresponds to the distance between the inductor 12 and an input of a radio receiver. It would be obvious to one skilled in the art to achieve an increase in the impedance to use any other element or any other arrangement that may be substituted for a ferrite element 14.

Another element for increasing the impedance may be a concentric coil or another arrangement of the line 13. Said arrangement may be a loop formed by the line 13 and provided with one or several windings, as shown in FIG. 14.

Figure 14:
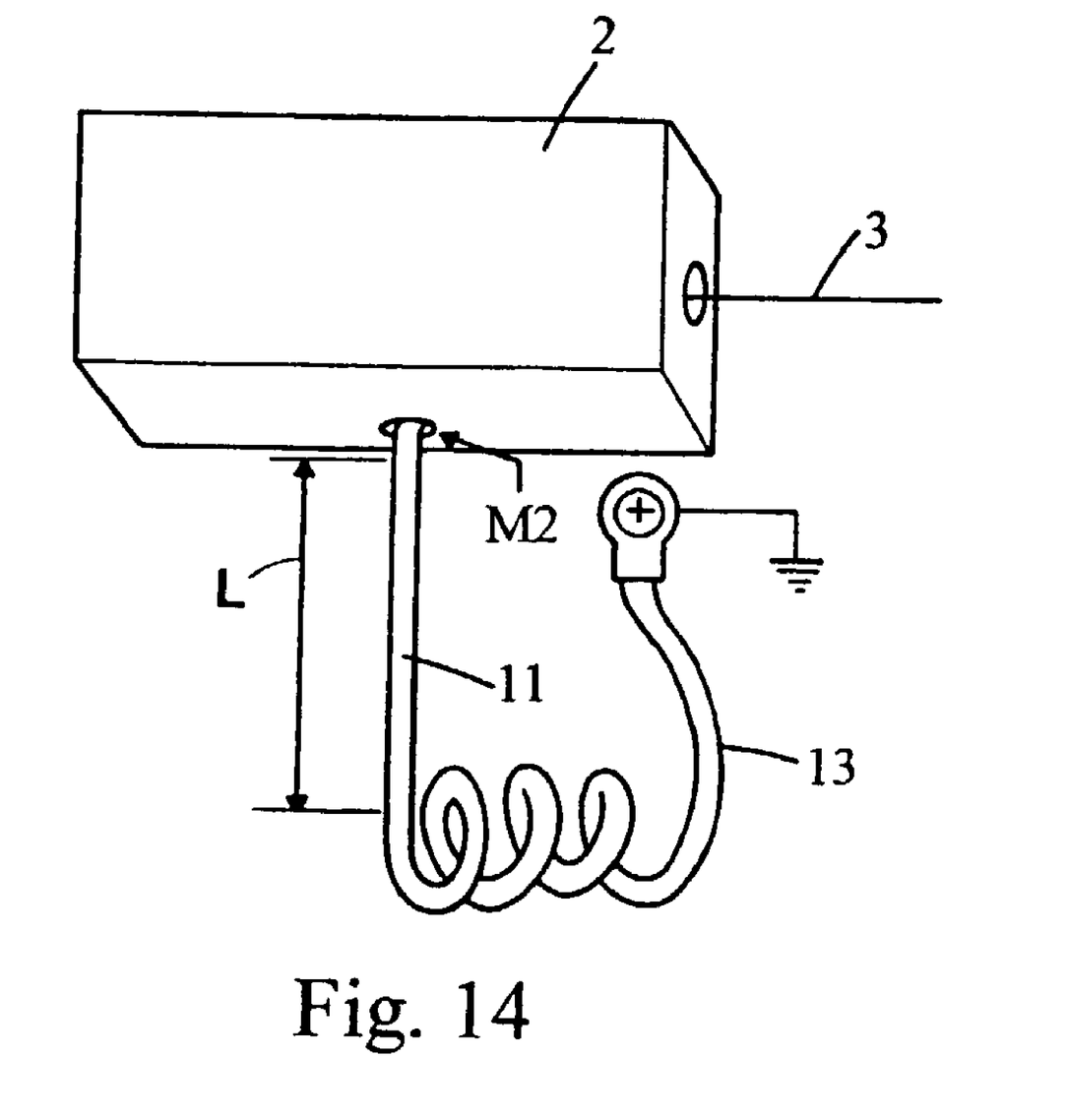
FIG. 14 is a perspective view of the inventive system depicting the line of the invention and the second module.

FIG. 14 illustrates an arrangement of the ground line 13 as an antenna 11, ground line 13 having a plurality of windings. A cable lug is connected to the ground line 13 at the free end of ground line 13 located opposite the second module 2. This lug can be fastened anywhere on the bodywork of the vehicle by means of a sheet metal screw. One end of ground line 13 is connected to the second module 2 and the other end to ground, thus having no free end as do typical antennas.

The inventive system as described may serve to activate or deactivate an alarm system or any other similar purpose, a combination of various applications being possible. The keyless system also comprises door locks with associated keys that are implemented in a manner well known in the art, as well as an entirely keyless door lock system.

Thus the inventive system described above provides a generic type of system that is less costly than known solutions. The cost reductions are achieved in part by utilizing the electrical line 13 that forms the connection to ground M2 of the second module 2 as the antenna 11 itself. This very inexpensive implementation of an antenna 11, which requires only a few passive components, makes it possible to receive a radio signal or a radio data. The electrical line 13 is readily connectable to many locations of the automotive vehicle at which a reception can be achieved and may be easily fastened to the body of the vehicle by means of a sheet metal screw and a cable lug such that the body of the vehicle acts simultaneously as ground. Because the antenna 11 is a line 13 to ground M2, few components are necessary for reception and for ground connection and current transmission. The antenna 11 is integrated into the ground line 13.

The cost of inventive system is further reduced by implementing the transmission line 3 as point-to-point communication using a single wire line, the first module 1 and the second module 2 each being provided with a ground connection M1 and M2 respectively, and the transmission line 3 being the only line between the two modules 1 and 2. As compared to bus lines or coaxial cables for example, the single wire transmission line 3 is much less costly and, since it is easy to run and disposed so as to be hardly visible, the installation is even further facilitated.

The costs are further reduced by the fact that the transmission line 3 carries, in addition to the radio data, a current supply potential for supplying the second module 2 with energy so that a separate current supply line is not required. A particular advantage is achieved if the radio data transmitted in the transmission line 3 are serial, digital data stream signals only. The digital stream signals are little prone to interference and occasion little interference as compared to high frequency radio signals. They further require little shielding and are therefore convenient to transmit. Again, this permits economies to be realized.

The inventive system is ideally suited for a keyless remote control door lock and unlock system known as RKE ("remote keyless entry"). In such a system, only few data need be transmitted by radio and conducted further within the vehicle. These data are the control commands "lock" for locking the doors or "unlock" for unlocking the doors. Since wireless remote control systems for doors have been used to a considerable extent in the automotive industry, the solution of the inventive system is not only inexpensive but particularly advantageous as compared to bus solutions because of the safety advantages it provides.

A thief, who nowadays is also acquainted with electronic immobilizers and digitally encoded door locks, can no longer break a vehicle door through the bus access as he or she can no longer gain access to the bus through a line that runs on the outside rearview mirror or in the engine compartment. He or she can no longer decipher the code for opening the vehicle door by means of a portable personal computer. In running an additional bus, it may not be necessary to make sure that the access be inaccessible to thieves since the inventive system permits bus decoupling. The decoding information is not transmitted over a bus.

High frequency isolation of the ground line 13 is achieved through an inductor 12, a plurality of windings of the ground line 13 forming the inductor 12 without the arrangement of a ferrite element. However, a ferrite element 14, advantageously a ring-shaped ferrite body, may also be used. The distance L from the ferrite element 14, or rather the distance from the windings, determines the electrical length of the antenna 11. As a result, the inductor 12 is disposed at a pre-determined distance L.

A further advantage of the inventive system is that, just like the first module 1, the second module 2 is disposed within the vehicle's body. The installation of the second module 2 and the running of the transmission line 3 is made much easier than if the second module 2 is to be disposed e.g., at the side-view mirror outside of the vehicle. If necessary, it may also be positioned elsewhere outside of the vehicle, e.g., if all of the window panes are metallic.

By running the entire transmission line 3 within the vehicle interior better protection from car thieves is achieved than if it were run from the outside. It is thereby particularly suited to dispose the second module 2 within an inside rearview mirror of the vehicle. This arrangement provides a receiving range in excess of 100 meters. As an alternative to the disposal on the front window pane, the second module 2 can be located on A, B or C column. Another low-cost variant consists in conveniently running the transmission line 3 by positioning the second module 2 in the region of the instrument panel.

A low-cost and extremely reliable development of the inventive system is more specifically achieved in connection with an RKE system ("remote keyless entry") when the first module 1 is provided with circuitry for detecting a current flowing in the transmission line 3 and is fitted with a first semiconductor switch T1, the current detecting circuitry and the first semiconductor switch being implemented and connected in such a manner that a data signal applied to a control input Data-Res, disposed upstream of the transmission line 3, is transmitted to an output Data-Gem of the first module 1. The second module 2 is provided with a second semiconductor switch T2 for switching a switching current that is much higher than the current supplied through the transmission line 3 to the second module 2. Altogether, only two transistors T1 and T2 and only a few passive component parts, as shown in FIG. 1, are needed for data transmission, this simple circuitry achieving a relatively high and interference-free transmission rate. The transmission is conducted from the second module 2 to the first module 1.

According to a preferred embodiment of the invention, the switching current is at least 5 times higher, preferably 5 to 10 times higher than the supply current. Thus, current fluctuations in the transmission line 3 that are caused by a varying supply current do not affect the data transmitted. The considerable distance between a high signal and the current supply level achieves in a simple manner a safe signal-to-noise ratio so that additional provisions for suppressing the noise level may be dispensed with. It is not necessary to use operational amplifiers. A switching current of at least 10 mA, preferably of about 20 mA, is particularly convenient. This value has been found reliable in connection with other transmission systems in an automotive vehicles. Suitably, the maximum supply current amounts to 2 mA maximum.

The second module comprise a radio receiver with a microcontroller having a maximum current consumption of 1 mA, an operating cycle of 1:10 and, as a result thereof, an effective operating current of 0.1 mA max., which has been found particularly advantageous. This smart radio receiver is capable of performing an operating cycle, a signal decoding and a transmitter detection completely on its own and without the assistance of a host microprocessor. As compared to other microcontroller approaches, this solution may well be integrated in the above mentioned circuitries and is very inexpensive "smart" RKE receiver solution.

In still another advantageous implementation of the inventive system a capacitor C2 is connected directly before and another capacitor C2 directly behind the transmission line 3. These capacitors C1 and C2 substantially act as EMC and an ESD protection and are devised so as not to negatively affect the data transmission.

The invention is not limited to the embodiments illustrated and described, as it also covers all equivalent implementations insofar as they do not depart form the spirit of the invention. Further, the invention is not yet limited to the combination of features as described herein but may be defined by any other combination of all of the individual features disclosed. Any person skilled in the art of radio frequency receiver systems will recognize from the previous detailed description and from the figures and claims that modifications could be made to the preferred embodiments of the invention without departing from the scope of the invention, which is defined by the following claims.

We claim:

1. A system for a vehicle for receiving and transmitting wireless transmitted radio data emitted outside said vehicle, comprising:
a first module disposed within said vehicle;
a second module disposed within said vehicle, said second module having a receiver disposed therein;
a transmission line connecting said first and second modules, said transmission line being adapted for transmitting said radio data in the form of a stream of digital data signals from said second module to said first module; and
an antenna connected to said receiver of said second module; said antenna being an electrical line that functions as a ground connection.

2. The system of claim 1, wherein said transmission line is a single wire line and said first and second modules each have one ground connection, said transmission line carrying, in addition to said radio data, supply current for supplying energy between said first and second modules.

3. The system of claim 2, wherein said radio data transmitted in the transmission line are a stream of digital data signals.

4. The system of claim 1, wherein said system is a keyless, remote control door lock and unlock system.

5. The system of claim 1, wherein at least a portion of said transmission line runs in a straight line.

6. The system of claim 1, wherein said transmission line has at least one winding adapted to forming an inductor.

7. The system of claim 6, wherein said transmission line is wound around a ferrite element.

8. The system of claim 7, wherein said ferrite element is a ring-shaped ferrite body.

9. The system of claim 6, wherein said inductor is disposed at a certain distance from an input of an antenna amplifier, said certain distance determining the electrical length of the antenna.

10. The system of claim 1, wherein said ground connection of said second module is disposed proximate to art antenna amplifier.

11. The system of claim 1, wherein said second module is disposed within the passenger compartment of the vehicle.

12. The system of claim 11, wherein said second module is disposed within the rearview mirror within said vehicle.

13. The system of claim 11, wherein said second module is disposed on a column of said vehicle.

14. The system of claim 11, wherein said second module is disposed in the instrument panel of said vehicle.

15. A system for a vehicle for receiving and transmitting wireless transmitted radio data emitted outside said vehicle, comprising:
a first module disposed within said vehicle;
a second module having a receiver disposed therein;
a transmission line connecting said first and second modules, said transmission line being adapted for transmitting said radio data from said second module to said first module;
an antenna connected to said receiver of said second module; said antenna being an electrical line that functions as a ground connection;
wherein said first module is provided with a first circuitry having a current detecting device for detecting current in said transmission line, said first circuitry being connected to a first semiconductor switch, said current detecting device and said first semiconductor switch being adapted for applying a data signal to a control input disposed upstream of said transmission line, said control input being transmitted to en output of said first module, and said second module is provided with a second circuitry being connected to a second semiconductor switch for switching a switching current that is much higher than the supply current supplied through said transmission line to said second module.

16. The system of claim 15, wherein said switching current is at least S times higher than said supply current.

17. The system of claim 15, wherein said switching current is at least 10 mA.

18. The system of claim 15, wherein the maximum supply current is 2 mA.

19. The system of claim 15, said second module comprising an antenna receiver with a microcontroller having a maximum current consumption of 1 mA, an operating cycle of 1:10 arid an actual operating current no greater than 0.1 mA.

20. The system of claim 15, said second module comprising an antenna receiver capable of performing an operating cycle, signal decoding and transmitter detection.

21. The system of claim 15, further comprising at least two capacitors adapted to act as ESD and EMC protection, one of said capacitors being disposed upstream and the other of sail capacitors being disposed downstream of said transmission line.

* * * * *